United States Patent [19]
Beck

[11] 4,355,307
[45] Oct. 19, 1982

[54] SAFETY STRESS SHUTDOWN SWITCH

[76] Inventor: Darrel R. Beck, 1601 Glenn Blvd., Duncan, Okla. 73533

[21] Appl. No.: 80,439

[22] Filed: Oct. 1, 1979

Related U.S. Application Data

[63] Continuation-in-part of Ser. No. 674,301, Nov. 26, 1976, abandoned.

[51] Int. Cl.³ .............................................. G08B 21/00
[52] U.S. Cl. .................................. 340/679; 73/802.64; 200/249; 340/665
[58] Field of Search ............. 340/665, 679; 73/141 A, 73/775, 862.64, 862.62, 862.54, 862.53; 200/249, 286, 259

[56] References Cited
U.S. PATENT DOCUMENTS 1,624,476  4/1927  Cummings .......................... 200/249

3,411,348  11/1968  Schultheis, Jr. .................. 73/141 A
3,952,879  4/1976  Grove ................................. 73/141 A
3,992,933  11/1976  Randolph, Jr. .................... 73/141 A

FOREIGN PATENT DOCUMENTS 1172021  6/1964  Fed. Rep. of Germany ... 73/141 A

Primary Examiner—Glen R. Swann, III
Attorney, Agent, or Firm—Robert S. Nisbett

[57] ABSTRACT

A method and apparatus for measuring a predetermined limit of deflection or stress of a load bearing means or beam such as a walking beam of an oil well pumping unit uses a spaced fixed arm mounted on said beam at one end and having a first sensor means attached near the other end with a second sensor mounted on said beam so that said beam deflects to produce a signal which can be used to sound an alarm or operate control means to relieve stress of said beam.

5 Claims, 5 Drawing Figures

SAFETY STRESS SHUTDOWN SWITCH

CROSS REFERENCES TO RELATED APPLICATIONS

This application is a continuation-in-part of co-pending application Ser. No. 674,301 filed Nov. 26, 1976, now abandoned benefit of which is claimed herein.

BACKGROUND OF THE INVENTION

This invention relates to a method and apparatus for measuring the load limit of a load bearing member such as a beam, channel or other slender structure load bearing member. In particular, this invention provides a method and apparatus for directly and simply indicating the point at which a load bearing means such as a beam or channel reaches a pre-selected limit or amount of deflection or stress. The invention also includes means for producing a signal at the limit point which can be used to control or activate means to stabilize, reduce or relieve the stress or load on the structural member thereby preventing damage to the member and appurtenant apparatus.

The method and apparatus of this invention are rugged and simple and particularly applicable to use on well pumping units for oil or other normally liquid or easily liquified natural resources where simplicity, ruggedness and reliability are of prime importance. These advantages are the result of an apparatus which can be constructed of numerous, readily available materials and which has only two portions which move in relation to each other and which in several preferred embodiments has no parts requiring close tolerance fitting or moving parts. In one preferred embodiment a sensor means does provide slideably adjustable sensor or contact points fitted within an insulating sleeve.

The deflection or load limit indicator of this invention is particularly useful with pumps such as pumping units used on oil wells which have a reciprocating length of sucker rod pumping means disposed in the well bore with valve means which lifts liquids or slurry of liquids with some solids and/or gas from the well upon reciprocation. The sucker rods and slurry are supported from the end of a beam or load bearing means which is pivoted about an axis or bearing attached near the middle or end opposite the sucker rods to a supporting means such as a frame or cross beam supported by a frame. The load bearing means, called a walking beam, is pivoted or reciprocated about the axis by a driving means such as an electric or internal combustion motor attached to the walking beam through a reciprocating means such as a crank shaft and pitman arm or beam. The walking beam or driving means typically has a weight and/or load balancing means to adjust the maximum load portion of the pumping cycle and weight and/or force distribution on the beam and drive means. The walking beam also typically has a constant radius head called a horse head from which the sucker rods are supported to provide constant vertical pull on the rods. The load adjustable components of the pumping unit make it difficult to use any conventional load or stress limit apparatus or method due to the changing load conditions during each cycle and over a period of time as the condition of the pumping unit, sucker rods and liquid slurry changes. This is especially applicable in oil fields using water flooding or where the slurry contains a large portion of water or aqueous fluid such as field brine where the load of the slurry column in the well bore can drastically change the load on the pumping unit.

This invention can be attached directly to the walking beam of the pumping unit, usually either on top or the bottom, even in the field after the pumping unit is in service to directly measure or indicate the point at which the load or deflection of the beam reaches a pre-selected limit. The deflection or load limit indicator of this invention produces a signal when the limit is reached which can be used to stop the pump or decrease the stress or deflection to prevent damage to the pumping unit.

SUMMARY OF THE INVENTION

An embodiment of the deflection or load limit apparatus of this invention comprises an apparatus for indicating a pre-set amount of deflection of a load bearing beam member comprising: (a) a first, mounting means attached to said beam member at a first selected location on said beam member; (b) an arm member having a fixed end and a moveable end attached to said mounting means at a spaced distance from said beam member; (c) a second mounting means attached to said beam member at a second location spaced a pre-determined distance from the point of attachment of said first mounting means, said pre-determined distance being in a plane parallel to the plane of deflection of said beam member; (d) a first indicating means removeably and adjustably attached to said arm member near the moveable end; a second indicating means removeably and adjustably attached to said second mounting means, with said first and second indicating means being moveably spaced from each other so that they move as said beam member deflects relative to each other in a plane parallel to the plane of deflection of said beam member and said indicating means comprising sensors which produce a signal when said indicating means have moved in said parallel plane a pre-determined distance relative to each other.

DESCRIPTON OF THE DISCLOSED EMBODIMENT

Figure 1:
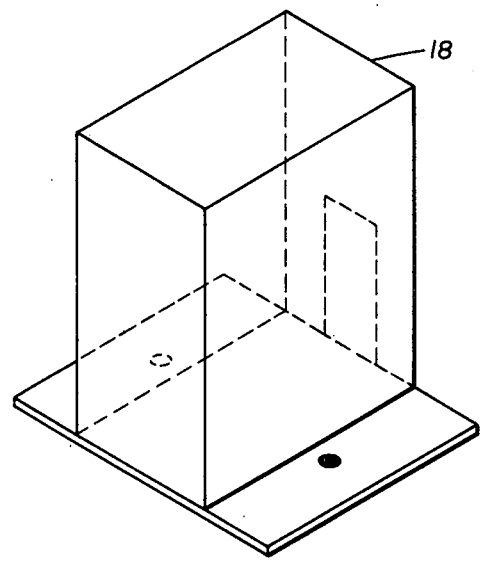
FIG. 1 shows an isometric view of the box cover for the assembly shown mounted on the base plate of FIG. 2 as indicated in FIGS. 4 and 5.
Figure 2:
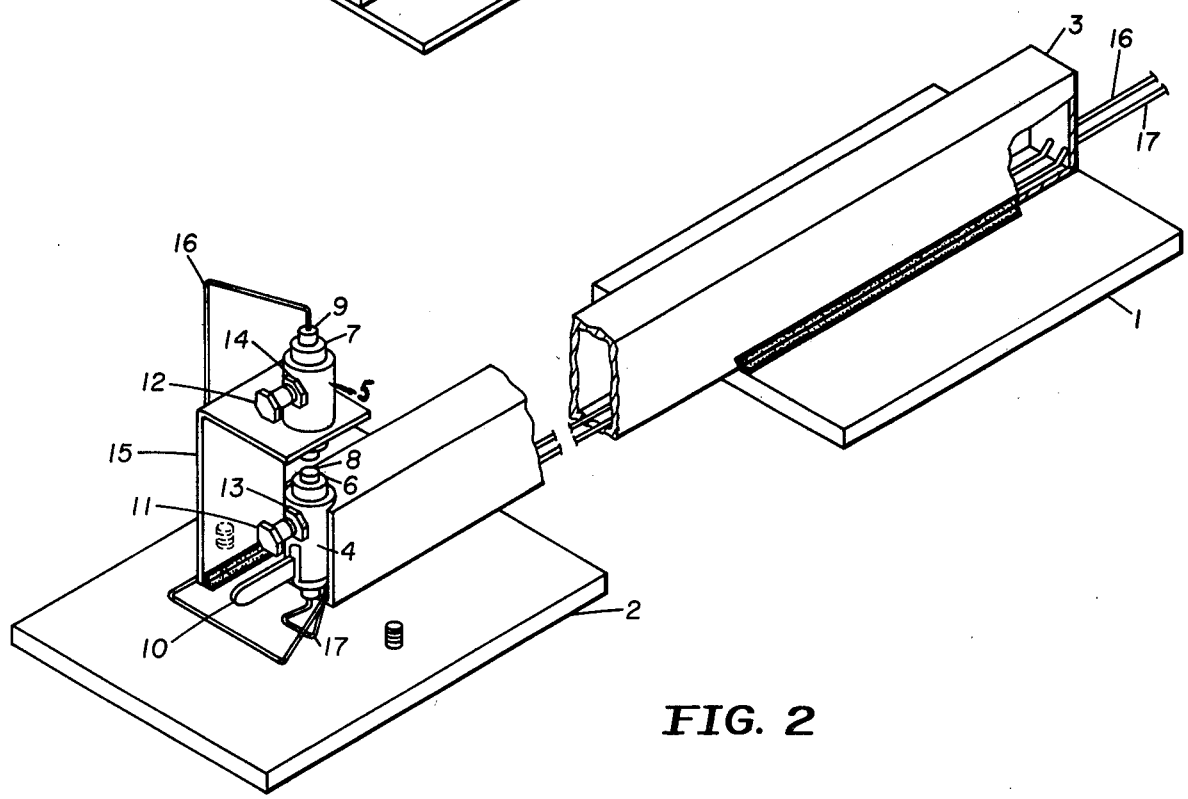
FIG. 2 shows an isometric view of the safety stress shutdown switch (except for the box cover as shown in FIG. 1).

One embodiment of the safety stress shutdown switch is shown in the drawings. FIG. 1 shows the box cover (18). In the right part of FIG. 2, showing base plate (1), the base plate is in isometric to show the thickness of the plate (1) and the square tubing (3), welded in center line to the first base plate (1). In the left side of FIG. 2, second base plate (2) is of about the same in thickness, width and length as the first base plate (1). Angle bar (15) is designed to off set to the left edge of square tubular arm (3) and it is welded to base plate (2), as shown in FIG. 2. In FIG. 2 a second cylinder (5) is attached to angle bar (15) in a vertical position, it is the part of second indicating means comprising cylinder (5), fitted insulation holder (7), and sensor means (9). Insulated wire (16) is attached to the sensor means (9) near the top. Bolt holder (12) is attached to the cylinder (5) through the nut tap (14) which can be welded to hold fitted insulation sleeves (7) and (9). Insulated strap (10) is attached to sensor (8) and passed through cylinder (4) which is slotted as is insulation sleeve (6) for setting up or down. In FIG. 2, attached in the other end of arm member (3) shown as the square tubular frame, is a first cylinder which is the same as or similar to cylinder (5). This first indicating means comprises first cylinder (4), an insulated holder (6) and sensor means (8) of the same design as sensor (9). Insulated wire (17) is attached to sensor (9) near the bottom. The cut-away at the end of square tube (3) shows the two insulated wires (16) and (17) inside of the tubing, and the cut-away at the other end shows the insulated wires (16) and (17) coming out at the boxed end of tube (3). In the left side of FIG. 2, near the number 2 on right side of the second base plate (2) and to the left, the bolt tap is shown for the box cover (18) shown in FIG. 1. FIG. 1 shows box cover (18) with the flange sides, tapped holes in the flanges to set the box down on base plate (2) of FIG. 2. In the box cover (18) is an isometric drawing which shows the relative thickness material, closed in on each side, top, sides, back end and front, with a cut-away in the right end to set over square tube (3) and bolt down to base plate (2) in FIG. 2.

Figure 4:
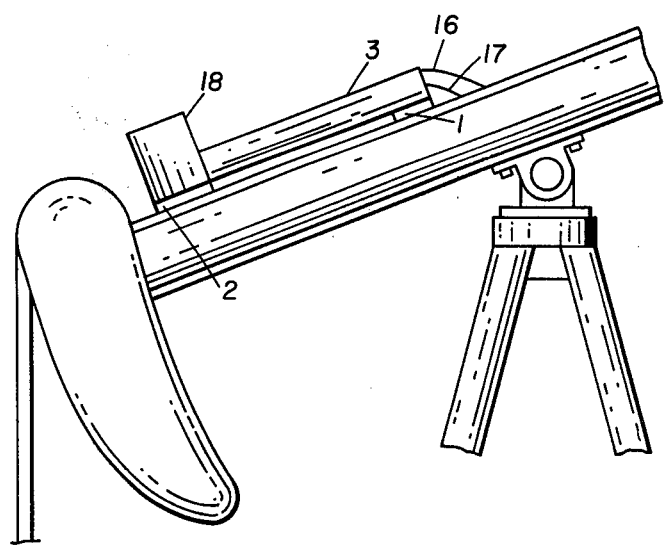

FIG. 4 shows a portion of a walking beam type of oil well pumping unit and the manner in which the switch is mounted in place after it is assembled to the pump unit without any load or stress on the beam.

Figure 5:
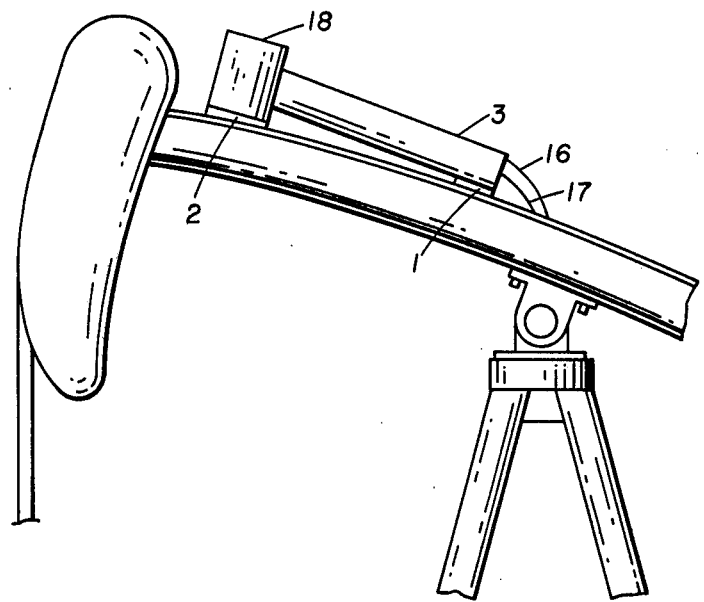
FIGS. 4 and 5 show elevation views of the safety stress shutdown switch as mounted on a walking beam in two positions.

FIG. 5 shows the same portion of the pumping unit and the effect of stress on the switch with the bend of the walking beam at the height of the load.

Figure 3:
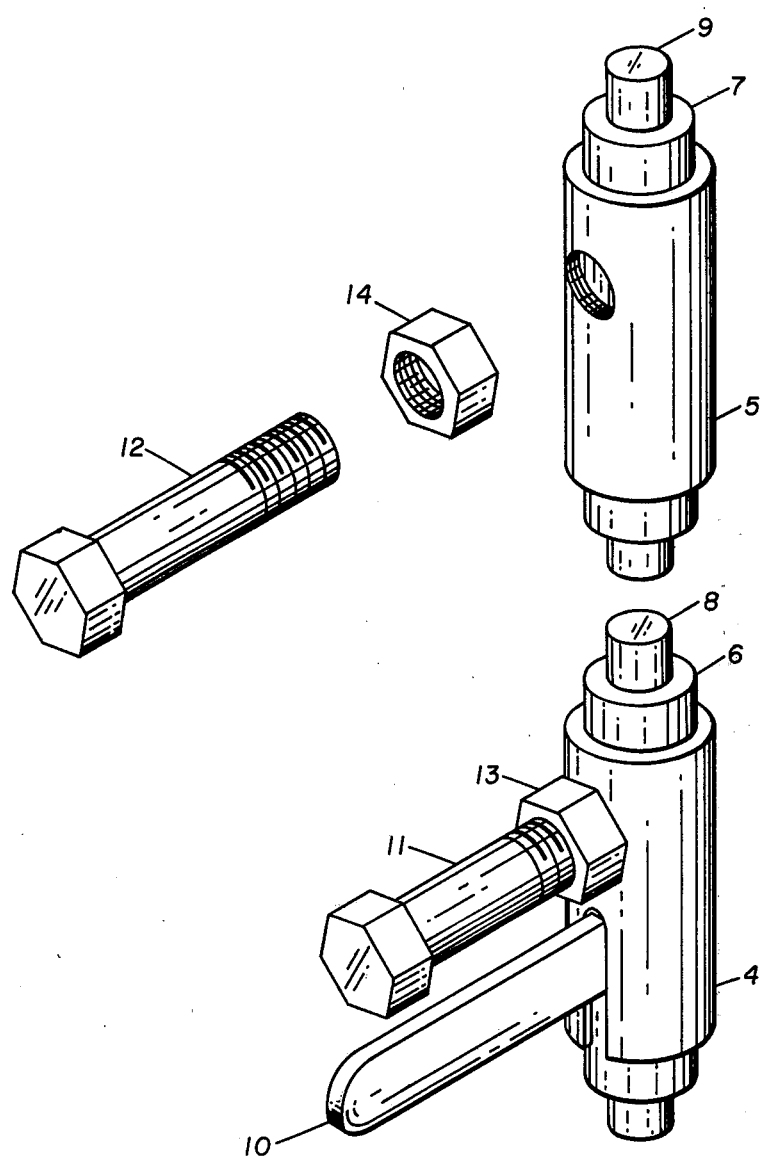
FIG. 3 shows a detailed view of the indicating means.

FIG. 3 shows a close up for erection of cylinders holders, (4) and (5), insulation sleeves (6) and (7), and bolt taps (13) and (14). The insulated strap (10), is attached to sensor (8) through insulation sleeve (6) so that it can move up or down by hand sensor (8) and sleeve (6) within cylinder (4) and the notch shown in cylinder (4).

The safety stress shutdown switch of this invention can be embodied as a designed apparatus for measuring a desired load on an oil well pumping unit (FIGS. 4 and 5), in a water injected field for recovery of fluid from an oil field. One embodiment of this apparatus can be designed with the first part consisting essentially of a square tube (3), with a first base plate (1) attached to the tube at one end of tube, to be fastened down to top of the walking beam, several inches ahead of the saddle bearing. To the other end of the square tube, a first cylinder (4) is attached in end of square tube, and in a vertical position; the open end of cylinder (4) is exposed one-half inch from bottom or top of square tube. The cylinder tap (13) is on side for a setting bolt to hold a fitted insulation (6). Inside of insulation is a fitted designed sensor (8) of a stainless tube of a smooth end surface in vertical position, with an insulated wire (17) out at end of tube; the wire is pulled through square tube out near end of base plate (1).

A second part is designed consisting of a second base plate (2), about same thickness as the one in part #1; an angle bar (15) is attached to the base plate off set to one side with top of angle bar over-lapping the square tube (3). In the top of the angle bar a second cylinder (5) of same design as in part #1 is attached with one end open through the angle bar. The cylinder is tapped (14) at one side above the top of the angle bar, same as the one in part #1 to hold insulation (7) and sensor device (9). Sensor device (9) is fitted through the cylinder (5), smooth tipped end down with insulated wire (16) out at top, and pulled through bottom of square tube (3) at bottom of cylinder (4) attached to square tube in part #1. This second base plate (2) is tapped on each side out at edge of base plate for bolts to hold a box cover (18). With these two parts assembled, part one is set in place on walking beam, base plate flush down on beam, set in center of beam, and then tack welded on all four corners.

Part #2 is assembled in manner as described with the two "sensors in center of walking beam and aligned", Part #2 over Part #1, then the second base plate is tack welded on all four corners, down to walking beam, same as part #1. A designed box cover protector (18) of steel, closed on top, two sides and back end, flanged on each side, tapped for bolt holes, one to each side, can be used to bolt down to base plate in part #2 to protect sensor when necessary. In front of the box cover a square opening is provided to let square tube (3) in part #1 work up and down without any resistance in top of box.

The base plates or moveably fixed mounting means can be any one of several conventional designs in view of this disclosure. The base plates provide set-off or a spaced distance from the walking beam or load bearing beam member. The beam member can also be any load bearing relatively slender structural form which is designed to flex or deflect under stress where the stress limit is important such as cantilevered beams, structural beams or combinations of structural members to form a structure subject to load, stress and deflection. The base plates can be a series of plates or a structure of any suitable structural material designed to support the components of the safety stress shutdown switch and to provide the necessary or desired off-set distance. The off-set distance is determined by the range of deflection of the beam, the clearance necessary for the arm member and other switch components and the amount of adjustment desired for the sensor elements. In some cases, the safety switch may be mounted on the side or below the load bearing beam and in some cases the beam may be subject to flexing or stress in more than one plane or one direction. In such cases, the safety switch may be mounted to measure deflection in only one plane or the net deflection or resultant deflection.

The safety switch can also be modified to use more than one combination of sensors or double acting sensors to measure deflection in more than one direction separately in view of this disclosure. For example, one sensor can be provided on the arm member with contact points extending above and below the arm member which touches or activates either one of two moveably fixed or adjustable sensors positioned above and below the arm mounted sensor at the desired point of deflection limit. In another modification, two or more sensor contact points can be sealed within an insulating sleeve so that one contact or sensor slides within the sleeve in response to a thin rigid arm or activation means and contacts one or more other sensor contact points at either end or various points along the sleeve. The sensors can also be mounted in the insulation sleeve with the moveable sensor biased by a spring or fluid pressure to move toward one end of the sleeve with movement controlled by a flexible cable or rigid arm. These contact points can be either cylindrical plugs within the sleeve or conductive or responsive areas or means within the side of the insulating sleeve. The sensor device or sensing means can also comprise a combination of a magnet and one or more magnet field sensing switches so that the sensors produce some type of signal when the magnet moves within or without a selected distance from each magnetic switch. Likewise, the sensing or indicating means can use other physical detection and/or transmitting forms or combinations thereof, such as electrical, pneumatic, mechanical, hydraulic, electromagnetic, photoelectric, sonic, etc., for either the detecting, transmitting or controlling functions of the switch means. The signal produced by the detection portion, which can be any one or combinations of the above forms, can be transformed and/or transmitted to operate indicators, recorders, controllers, or other conventional equipment as desired or necessary to perform the function desired. As another example of combination of sensors, the safety switch can use a photoelectric cell and a source of light beam with either mounted on the arm and the other mounted on the beam. With this combination, both light beam sensing means and light source means can be mounted in one position or adjacent to each other and one or more mirrors, prisms or other reflecting means used to control the path of the light beam in response to the deflection of the beam.

The arm member, mounting plates, sensor devices, signal and signal conducting means such as the insulated wires, angle bar, insulating sleeves, cylinders of the sensors, box cover and other portions of the safety switch can be constructed in various forms or modifications using any conventional and suitable material in view of this disclosure and are not restricted to any particular shape, size, location, material of construction or method of assembly or attachment.

The plane of deflection of the load bearing beam is the plane defined by the movement of a point of the beam or a suitable plane parallel to that plane. The plane of movement of the sensors or indicating means is the plane defined by the center axis or center of the contact points of the sensors and their movement in response to deflection of the load bearing beam.

I claim:

1. An apparatus for indicating a pre-set amount of deflection of a load bearing beam member which is pivoted and reciprocated about an axis comprising:

(a) a first mounting means attached to said beam member at a first selected location on said beam member;
    (b) an arm member having a fixed end and a moveably end attached to said first mounting means near the fixed end of said arm member at a predetermined distance from said beam member;
    (c) a second mounting means attached to said beam member at a second location spaced a pre-determined distance from the point of attachment of said first mounting means, said pre-determined distance being in a plane parallel to the plane of deflection of said beam member;
    (d) a first indicating means removeably and adjustably attached to said arm member near the moveably end;
    (e) a second indicating means removeably and adjustably attached to said second mounting means, with said first and second indicating means being moveably spaced from each other so that, as said beam member deflects they move relative to each other in a plane parallel to the plane of deflection of said beam member, said indicating means comprising sensors which produce a signal when said indicating means have moved in said parallel plane a pre-determined distance relative to each other; and wherein the indicating means comprise generally cylindrical electrically non-conductive sheaths holding electrically conductive sensors wherein at least one sensor is slideably adjustable.

2. An apparatus of claim 1 which includes a transmitting means to transmit the signal produced by said sensors.

3. An apparatus of claim 1 in which the plane of deflection of said beam member and the parallel plane of movement of said indicating means are the same.

4. An apparatus of claim 1 in which the first and second mounting means comprise a generally rectangular steel plate and the plane of said plate is generally perpendicular to the plane of deflection of said beam member.

5. An apparatus of claim 1 wherein the first and second mounting means comprise plates which can be attached to said beam; and wherein said arm member comprises a square tube; wherein said first and second indicating means comprise cylinders holding insulated electromechanical sensor means.

* * * * *